May 13, 1930.  C. B. CARLSON  1,758,218
ELECTRICAL CONNECTER
Filed April 14, 1925
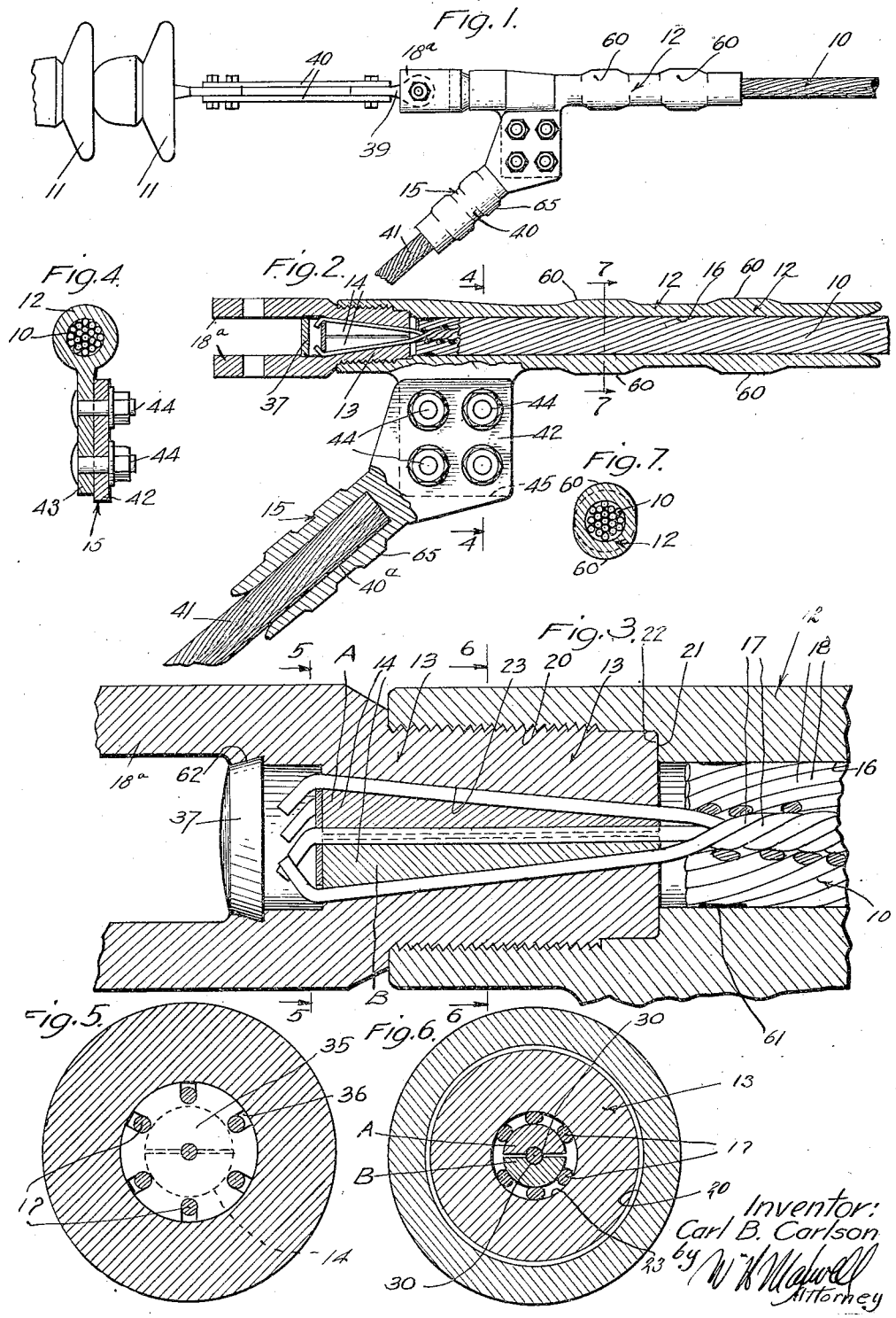

Patented May 13, 1930

1,758,218

UNITED STATES PATENT OFFICE

CARL B. CARLSON, OF LOS ANGELES, CALIFORNIA

ELECTRICAL CONNECTER

Application filed April 14, 1925. Serial No. 23,006.

This invention relates to a connecter or device for connecting the end of the cable to a suitable support.

In transmitting high voltage electric currents, it is common to use stranded metal cables, usually cables formed of a core comprising a plurality of steel strands, and by a plurality of aluminum or aluminum alloy strands wrapped around the core. This construction gives the cable the necessary strength and is at the same time comparatively light. It is usual to connect the ends of such cables to towers or other supports by means of clamp devices including sections which bolt or clamp together on the ends of the cables. These clamp devices are comparatively large and heavy and include a plurality of bolts which are inconvenient and slow to operate. Further, it has been found that these clamps cause failure of the cables where they enter the clamp sections, this failure being due to the vibrations or movements of the cable being positively stopped or checked where the cables enter the clamps.

It is an object of this invention to provide a light, strong connection for holding the end of a stranded cable. By providing a light and comparatively small construction for this purpose the work and time required to make a connection is minimized.

A further object of this invention is to provide a connecter which will hold a stranded cable without causing it to crystallize or fail in the manner commonly experienced in the case of usual clamp connecters.

The various objects and features of the invention will be best and more fully understood from the following detailed description of a typical form and application of the invention throughout which description reference is had to the accompanying drawings in which Fig. 1 is a side elevation of the connection between a stranded metal cable and a string of insulators.

Fig. 2 is a longitudinal detailed sectional view of the connecter provided by this invention showing the manner in which it receives and holds the cable and also the end of a jumper loop.

Fig. 3 is an enlarged detailed view of a portion of the parts shown in Fig. 2.

Fig. 4 is a detailed transverse sectional view taken as indicated by line 4—4 on Fig. 2.

Fig. 5 is a detailed transverse sectional view taken as indicated by line 5—5 on Fig. 3.

Fig. 6 is a detailed transverse sectional view taken as indicated by line 6—6 on Fig. 3, and Fig. 7 is a sectional view taken as indicated by line 7—7 on Fig. 2.

The connecter provided by this invention is suitable for use in various places and under various conditions where it is desired to connect the end of a stranded cable 10 with another part or object, for instance, to a fixed support. In the drawings I have chosen to illustrate a typical application of the invention in which the connecter is arranged to connect the end of a stranded metal cable 10 to a string of insulators 11 which insulators are carried by a fixed support (not shown).

The connecter includes, generally, an elongate body 12, a socket 13, carried at the outer end of the body, a wedge 14 which cooperates with the socket, a fitting 15 adapted to connect the end of a jumper loop, or the like, with the body 12 and various other parts the details and functions of which will be hereinafter set forth.

The body 12 which is elongate in form is provided with a longitudinal opening 16. The cable 10 is arranged in the opening 16 of the body through its inner end in the manner clearly illustrated in Figs. 2 and 3 of the drawings. In accordance with my invention the body 12 is formed of the same material as the parts of the cable 10 which contact with it, for instance, in standard practice where a standard reinforced stranded aluminum cable is employed I prefer to form the body 12 of aluminum or an alloy of aluminum so that it is light and has characteristics substantially the same as those of the cable. The standard stranded aluminum cable includes a reinforcing core or center formed of a plurality of stranded steel wires 17, and a plurality of wires or strands 18 of aluminum wrapped around the core. In accordance with this invention the body 12 is made sufficiently long to receive a substantial portion of cable 10 and when the cable is in place in the body an effective connection, both mechanical and electrical, is made between the body 12 and the strands 18 of aluminum by compressing the body onto the cable so that the body engages the aluminum strands with a high pressure, for instance, in practice the body 12 is compressed onto the cable with about 10,000 pounds pressure per square inch. In practice I provide the body at several points along its length with diametrically opposite projections 60 which are pressed in to be substantially flush with the rest of the body when pressure is applied to the body to press it onto the cable. When the pressure is applied the body grips the cable and the wires of the cable press or conform to one another. The pressure causes the wall of the opening 16 in the body, the exterior of the cable and the several parts of the cable to conform to one another and form practically one continuous body of metal.

The socket 13 is carried at the outer end of the body 12. In the preferred form of construction the socket 13 screw threads into an enlarged screw threaded portion 20 at the outer end of the opening 16 so that the inner end 21 of the socket engages the shoulder 22 formed in the body between the opening 16 and enlarged portion 20. The socket has a central opening 23 extending longitudinally through it, which opening is tapered or convergent so that it is substantially larger at the inner or rear end of the socket than at the inner or forward end of the socket. The opening 23 is preferably round in cross sectional configuration and tapered uniformly throughout its length as shown in the drawings. The wedge 14 operates in the socket to cooperate with the socket in holding the core wires 17 of the cable 10. Before arranging the cable 10 in the body 12 the end portions of the aluminum strands or wires 18 are cut or dressed away so that the steel core wires 17 project beyond the aluminum wires 18. A binding 61 of tape or the like is applied to the end of the aluminum portion of the cable to hold the strands together. When the cable is arranged in the body the core wires 17 project into the opening 23 in the socket. The wedge 14 cooperates with the socket in holding these core wires. In accordance with the preferred form of my invention the wedge 14 is tapered to correspond to the taper of the opening 23 and is split or formed in two sections A and B. In the preferred arrangement the wedge is provided with a central opening formed by providing corresponding grooves 30 in the adjoining faces of the two sections to receive the central strand 17 of the core. The remaining strands 17 of the core are arranged in the opening 23 so that they are between the wall of the opening and the wedge. When the wedge and strands 17 are in position the wedge is driven into the opening until the strands are tightly held. With this arrangement strain tending to withdraw the core wires from the socket causes the wedge sections to tighten onto the central core wires 17 and to clamp the other core wires against the wall of the opening 23. In practice the end portions of the core wires extend beyond or past the rear end of the wedge where they may be bent or turned as shown in Fig. 3 of the drawings and may be held in proper spaced relation around in the socket by a spacer plate 35 having a plurality of openings 36 which receive and hold the wires in the manner clearly shown in Figs. 3 and 5 of the drawings. The rear end of the opening in the socket is preferably closed by a plug 37, or the like. In practice the plug is in the form of a cupped metal disc and is expanded into a tapered opening 62 in the rear end of the socket.

The socket 13 is provided with means for connection with a support, for instance, in the form of the invention shown in the drawings, the socket is provided with two spaced rearwardly extending projections or arms 18ª which receive and hold a member 39 serving to connect the socket with a string of insulators 11 through links 40. In this particular form of connection it is merely typical of that which may be provided in practice.

The fitting 15 provided to hold the end of a jumper loop, or the like for the purpose of making a proper electrical connection between the loop and body 12, may include a tubular part 40 which receives and is compressed onto the end of the jumper loop 41 and a flange like projection 42 on the part 40 to be secured to a corresponding flange like part 43 projecting from the body 12. In the drawings I have shown the flange like parts 42 and 43 secured together by a plurality of bolts 44. The part 40 may be provided with projecting parts 65 like the projecting parts on the body.

From the foregoing description it will be apparent that the device provided by this invention is comparatively light and small in construction and that it operates to hold the end of a cable in a particularly secure and reliable manner. In fact, I have found that the connection made by this device is equal in strength to the cable. Further, it is to be noted that the device can be operated to receive and hold a cable without the manipulation of numerous parts such as bolts or the like, and that the device may be handled quickly and with far greater ease than can an ordinary clamp connecter.

Having described only a typical preferred form of my invention I do not wish to limit myself to the specific details set forth, but wish to reserve to myself any changes or variations that may appear to those skilled in the art or fall within the scope of the following claims:

Having described my invention, I claim:

1. A device for holding a cable having a stranded reenforcing core including, a main part with a tubular body to be compressed onto the end portion of the cable, and a wedge in the outer end of the main part related thereto to clamp the strands of the core outwardly against the inner wall of said part.

2. A device for holding a cable having a reenforcing core including a body to receive the end portion of the cable, and means at the outer end of the body to hold the core, said means including a socket screw threaded directly to the body and a wedge fitting the socket to clamp the core outwardly in the socket.

3. A device for holding a cable having a reenforcing core including a body to receive the end portion of the cable, and means at the outer end of the body to hold the core, said means including a socket screw threaded directly to the body and a wedge fitting the socket to clamp strands of the core outwardly in the socket, the wedge being formed by two separate sections and having an opening to hold the center strand of the core.

4. A device for holding a cable having a reenforcing core including a body to receive the end portion of the cable, and means at the outer end of the body to hold the core, said means including a socket separable from the body and mounted directly therein, the socket having an opening through it receiving the core, a wedge in the opening related thereto to clamp the core outwardly therein, and a plug in the rear end of the opening.

5. A device for holding a cable having a conductive outer body and a reenforcing core including a body to receive the end portion of the cable, and a wedge at the outer end of the body to hold the core, the body of the device being of a material having characteristics the same as the body of the cable and being compressible onto the cable.

In witness that I claim the foregoing I have hereunto subscribed my name this 14th day of March, 1925.

CARL B. CARLSON.